United States Patent
Kolouri et al.

(10) Patent No.: US 10,908,616 B2
(45) Date of Patent: *Feb. 2, 2021

(54) ATTRIBUTE AWARE ZERO SHOT MACHINE VISION SYSTEM VIA JOINT SPARSE REPRESENTATIONS

(71) Applicant: HRL Laboratories, LLC, Malibu, CA (US)

(72) Inventors: Soheil Kolouri, Calabasas, CA (US); Mohammad Rostami, Santa Monica, CA (US); Kyungnam Kim, Oak Park, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 16/033,638

(22) Filed: Jul. 12, 2018

(65) Prior Publication Data

US 2019/0025848 A1    Jan. 24, 2019

Related U.S. Application Data

(63) Continuation-in-part of application No. 15/949,896, filed on Apr. 10, 2018.

(Continued)

(51) Int. Cl.
*G06K 9/62* (2006.01)
*G05D 1/02* (2020.01)
(Continued)

(52) U.S. Cl.
CPC ......... *G05D 1/0246* (2013.01); *G05D 1/0088* (2013.01); *G06K 9/00791* (2013.01);
(Continued)

(58) Field of Classification Search
CPC ............... G05D 1/0088; G05D 1/0246; G06K 9/00791; G06K 9/6249; G06K 9/6259; G06K 9/6262; G06K 9/627
See application file for complete search history.

(56) References Cited

U.S. PATENT DOCUMENTS 9,110,922 B2    8/2015   Benigio et al.
9,566,981 B2    2/2017   Rebhan et al.
(Continued)

FOREIGN PATENT DOCUMENTS

CN    104036021 A      9/2014
WO   WO2017139764 A1  8/2017

OTHER PUBLICATIONS

Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826. 2013.

(Continued)

*Primary Examiner* — Nirav G Patel
(74) *Attorney, Agent, or Firm* — Tope-McKay & Associates (57) ABSTRACT

Described is a system for object recognition. The system generates a training image set of object images from multiple image classes. Using a training image set and annotated semantic attributes, a model is trained that maps visual features from known images to the annotated semantic attributes using joint sparse representations with respect to dictionaries of visual features and semantic attributes. The trained model is used for mapping visual features of an unseen input image to its semantic attributes. The unseen input image is classified as belonging to an image class, and a device is controlled based on the classification of the unseen input image.

20 Claims, 7 Drawing Sheets

Related U.S. Application Data (60) Provisional application No. 62/557,721, filed on Sep. 12, 2017, provisional application No. 62/502,461, filed on May 5, 2017.

(51) Int. Cl.
*G05D 1/00* (2006.01)
*G06K 9/00* (2006.01)

(52) U.S. Cl.
CPC .......... *G06K 9/627* (2013.01); *G06K 9/6249* (2013.01); *G06K 9/6259* (2013.01); *G06K 9/6262* (2013.01)

(56) References Cited

U.S. PATENT DOCUMENTS

| | | |
|---|---|---|
| 2003/0202683 A1 | 10/2003 | Ma et al. |
| 2011/0191374 A1 | 8/2011 | Bengio et al. |
| 2016/0239711 A1 | 8/2016 | Gong et al. |
| 2017/0006261 A1 | 1/2017 | Debilde et al. |
| 2018/0260651 A1 | 9/2018 | Wang |

OTHER PUBLICATIONS

Romera-Paredes, Bernardino, and P. H. S. Torr. "An embarrassingly simple approach to zero-shot learning." In Proceedings of The 32nd International Conference on Machine Learning, pp. 2152-2161. 2015.
Simonyan, Karen, and Andrew Zisserman. "Very deep convolutional networks for large-scale image recognition." arXiv preprint arXiv:1409.1556. 2014, pp. 1-14.
Mikolov, T., Sutskever, I., Chen, K., Corrado, G.S. and Dean, J., 20. "Distributed representations of words and phrases and their compositionality." In Advances in Neural Information Processing Systems, pp. 3111-3119. 2013.
Tibshirani, Ryan J. "The lasso problem and uniqueness." Electronic Journal of Statistics, 7, pp. 1456-1490. 2013.
Huang, Yongwei, and Daniel P. Palomar. "Randomized algorithms for optimal solutions of double-sided QCQP with applications in signal processing." IEEE Transactions on Signal Processing, 62, No. 5, pp. 1093-1108. 2014.
Yang, J., Wright, J., Huang, T.S. and Ma, Y., 2010. "Image super-resolution via sparse representation." IEEE Transactions on Image Processing, 19(11), pp. 2861-2873. 2010.
Welinder, Peter, Steve Branson, Takeshi Mita, Catherine Wah, Florian Schroff, Serge Belongie, and Pietro Perona. "Caltech-UCSD birds 200." 2010, pp. 1-15.
International Preliminary Report on Patentability Chapter II for PCT/US2018/041806; dated Sep. 16, 2019.
Romera-Paredes, Bernardino, and P. H. S. Torr. "An embarrassingly simple approach to zero-shot teaming." In Proceedings of The 32nd International Conference on Machine Learning, pp. 2152-2161, 2015.
Isele D, Rostami M, Eaton E. "Using task features for zero-shot knowledge transfer in lifelong learning". In Proc. of IJCAI 2016, pp. 1620-1626.
Mikolov, T., Sutskever, I., Chen, K., Corrado, G.S. and Dean, J., Distributed representations of words and phrases and their compositionality. In Advances in Neural Information Processing Systems, pp. 3111-3119, 2013.
Tibshirani, Ryan J. "The lasso problem and uniqueness." Electronic Journal of Statistics, pp. 1456-1490, 2013.
Yang, J., Wright, J., Huang, T.S. and Ma, Y., Image super-resolution via sparse representation. IEEE transactions on Image processing, 19(11), pp. 2861-2873, 2010.
Grandvalet Y, Bengio Y. "Semi-supervised Learning by Entropy Minimization". In NIPS, Dec. 1, vol. 17, pp. 529-536, 2004.
Huang S, Tran DN, Tran TD. "Sparse signal recovery based on nonconvex entropy minimization". In Image Processing (ICIP), 2016 IEEE International Conference on Sep. 25, 2016, pp. 3867-3871, 2016.
Beck A, Teboulle M. "A fast iterative shrinkage-thresholding algorithm for linear inverse problems". SIAM journal on Imaging sciences. Mar. 4;2(1), pp. 183-202, 2009.
Welinder P, Branson S., Mita T, Wah C, Schroff F, Belongie S, Perona, P. "Caltech-UCSD Birds 200". California Institute of Technology. CNS-TR-2010-001. 2010, pp. 1-15.
Notification of Transmittal of International Search Report and the Written Opinion of the International Searching Authority for PCT/US2018/041806; dated Dec. 7, 2018.
International Search Report of the International Searching Authority for PCT/US2018/041806; dated Dec. 7, 2018.
Written Opinion of the International Searching Authority for PCT/US2018/041806; dated Dec. 7, 2018.
Notification of Transmittal of International Search Report and the Written Opinion of the International Searching Authority for PCT/US2018/026951; dated Mar. 12, 2019.
International Search Report of the International Searching Authority for PCT/US2018/026951; dated Mar. 12, 2019.
Written Opinion of the International Searching Authority for PCT/US2018/026951; dated Mar. 12, 2019.
Ziming Zhang et al. 'Zero-Shot Learning via Joint Latent Similarity Embedding' In: The IEEE Conference on Computer Vision and Pattern Recognition (CVPR), 2016, pp. 6034-6042.
Notification and International Preliminary Report on Patentability (Chapter I) for PCT/US2018/026951; dated Aug. 7, 2019.
Office Action 1 for U.S. Appl. No. 15/949,896, dated Oct. 21, 2019.
Liang, Heming, and Qi Li, "Hyperspectral imagery classification using sparse representations of convolutional neural network features," Remote Sensing 8.2 (2016): 99. (Year: 2016).
Response to Office Action 1 for U.S. Appl. No. 15/949,896, dated Feb. 17, 2020.
Notice of Allowance for U.S. Appl. No. 15/949,896, dated Apr. 24, 2020.

ATTRIBUTE AWARE ZERO SHOT MACHINE VISION SYSTEM VIA JOINT SPARSE REPRESENTATIONS

CROSS-REFERENCE TO RELATED APPLICATIONS

This is a Continuation-in-Part of U.S. application Ser. No. 15/949,896, filed in the United States on Apr. 10, 2018, entitled, "Zero Shot Machine Vision System via Joint Sparse Representations," which is a Non-Provisional patent application of U.S. Provisional Application No. 62/502,461, filed in the United States on May 5, 2017, entitled, "Zero Shot Machine Vision System via Joint Sparse Representations," the entirety of which are hereby incorporated by reference.

This is also a Non-Provisional application of U.S. Provisional Application No. 62/557,721, filed in the United States on Sep. 12, 2017, entitled, "Attribute Aware Zero Shot Machine Vision System Via Joint Sparse Representations," the entirety of which is incorporated herein by reference.

BACKGROUND OF INVENTION (1) Field of Invention

The present invention relates to a system for object recognition and, more particularly, to a system for object recognition via joint sparse representations.

(2) Description of Related Art

Zero-shot learning is being able to perform a task despite not having received any training examples of that task. Zero-shot machine vision methods are described by Akata et al. (see Literature Reference No. 1 of the List of Incorporated Literature References) and Romera et al. (see Literature Reference No. 2). In Literature Reference No. 1, the authors proposed a model that embeds image features and semantic attributes in a common space (i.e., a latent embedding), where the compatibility between them is measured via a bi-linear function.

Romera et al. (see Literature Reference No. 2) proposed a general linear framework that relates image features, attributes, and classes. The method described by Romera et al. utilizes a principled choice of regularizers that enables the authors to drive a simple closed form solution to the problem. Yang et al. (see Literature Reference No. 8) popularized the idea of joint dictionary learning with their work on image super-resolution via joint sparse dictionary learning. Finally, Isele et al. (see Literature No. 4) took the idea of joint dictionary learning and applied it to a transfer learning problem in a reinforcement learning setting.

The major disadvantages of the methods disclosed in the prior art include: 1) oversimplifying the problem by assuming a linear relation between data features and semantic attributes, and 2) sensitivity to ad hoc regularizers that need to be tuned for each application.

Thus, a continuing need exists for an improved zero-shot machine vision system that can recognize novel objects even if the system has never seen any instance of the object in the training phase.

SUMMARY OF INVENTION

The present invention relates to a system for object recognition and, more particularly, to a system for object recognition via joint sparse representations. The system comprises one or more processors and a memory having instructions such that when the instructions are executed, the one or more processors performs multiple operations. A training image set and annotated semantic attributes are used to train a model that maps visual features from known images to the annotated semantic attributes using joint sparse representations with respect to dictionaries of visual features and semantic attributes. The trained model is used for mapping visual features of an unseen input image to its semantic attributes. The unseen input image is classified as belonging to an image class, and a device is controlled based on the classification of the unseen input image, wherein the device is a vehicle component, and controlling the device results in a vehicle maneuver.

In another aspect, the system generates a training image set comprising object images from a plurality of image classes, wherein each object image in the training image set has been annotated with a class label and semantic attributes describing the object image.

In another aspect, for training the model, a visual feature space and a semantic attribute space are modeled as non-linear spaces that provide an identical sparse representation for visual features and their corresponding semantic attributes.

In another aspect, the system finds a sparse representation for a visual feature extracted from the unseen input image, and a semantic attribute prediction is generated that is resolved in the semantic attribute space of the model, wherein a soft-assignment probability vector identifies a probability of the semantic attribute prediction belonging to a class of unseen images.

In another aspect, a regularization parameter is used to regulate entropy of the soft-assignment probability vector.

In another aspect, given the semantic attribute prediction, the unseen input image is labeled using a class label of a closest semantic attribute in the semantic attribute space of the model.

In another aspect, the vehicle maneuver is a collision avoidance maneuver.

In another aspect, wherein the unseen input image is an image of an avoidance object, and wherein an alert is generated when the avoidance object is classified.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

The present invention relates to a system for object recognition and, more particularly, to a system for object recognition via joint sparse representations. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Before describing the invention in detail, first a list of cited references is provided. Next, a description of the various principal aspects of the present invention is provided. Finally, specific details of various embodiment of the present invention are provided to give an understanding of the specific aspects.

(1) LIST OF INCORPORATED LITERATURE REFERENCES

The following references are cited and incorporated throughout this application. For clarity and convenience, the references are listed herein as a central resource for the reader. The following references are hereby incorporated by reference as though fully set forth herein. The references are cited in the application by referring to the corresponding literature reference number as follows:

1. Akata, Zeynep, Florent Perronnin, Zaid Harchaoui, and Cordelia Schmid. "Label-embedding for attribute-based classification." In Proceedings of the IEEE Conference on Computer Vision and Pattern Recognition, pp. 819-826, 2013.
2. Romera-Paredes, Bernardino, and P. H. S. Torr. "An embarrassingly simple approach to zero-shot learning." In Proceedings of The 32nd International Conference on Machine Learning, pp. 2152-2161, 2015.
3. Simonyan, Karen, and Andrew Zisserman. "Very deep convolutional networks for large-scale image recognition." arXiv preprint arXiv: 1409.1556, 2014.
4. Isele D, Rostami M, Eaton E. "Using task features for zero-shot knowledge transfer in lifelong learning". In Proc. of IJCAI 2016, pp. 1620-1626.
5. Mikolov, T., Sutskever, I., Chen, K., Corrado, G. S. and Dean, J., Distributed representations of words and phrases and their compositionality. In Advances in Neural Information Processing Systems, pp. 3111-3119, 2013.
6. Tibshirani, Ryan J. "The lasso problem and uniqueness." Electronic Journal of Statistics, pp. 1456-1490, 2013.
7. Huang, Yongwei, and Daniel P. Palomar. "Randomized algorithms for optimal solutions of double-sided QCQP with applications in signal processing." IEEE Transactions on Signal Processing 62, no. 5, pp. 1093-1108, 2014.
8. Yang, J., Wright, J., Huang, T. S. and Ma, Y., Image super-resolution via sparse representation. IEEE transactions on image processing, 19(11), pp. 2861-2873, 2010.
9. Grandvalet Y, Bengio Y. "Semi-supervised Learning by Entropy Minimization". In NIPS, December 1, Vol. 17, pp. 529-536, 2004.
10. Huang S, Tran D N, Tran T D. "Sparse signal recovery based on nonconvex entropy minimization". In Image Processing (ICIP), 2016 IEEE International Conference on 2016 Sep. 25, pp. 3867-3871, 2016.
11. Beck A, Teboulle M. "A fast iterative shrinkage-thresholding algorithm for linear inverse problems". SIAM journal on imaging sciences. March 4; 2(1), pp. 183-202, 2009.
12. Welinder P, Branson S., Mita T, Wah C, Schroff F, Belongie S, Perona, P. "Caltech-UCSD Birds 200". California Institute of Technology. CNS-TR-2010-001. 2010.

(2) PRINCIPAL ASPECTS

Various embodiments of the invention include three "principal" aspects. The first is a system for object recognition. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

Figure 1:
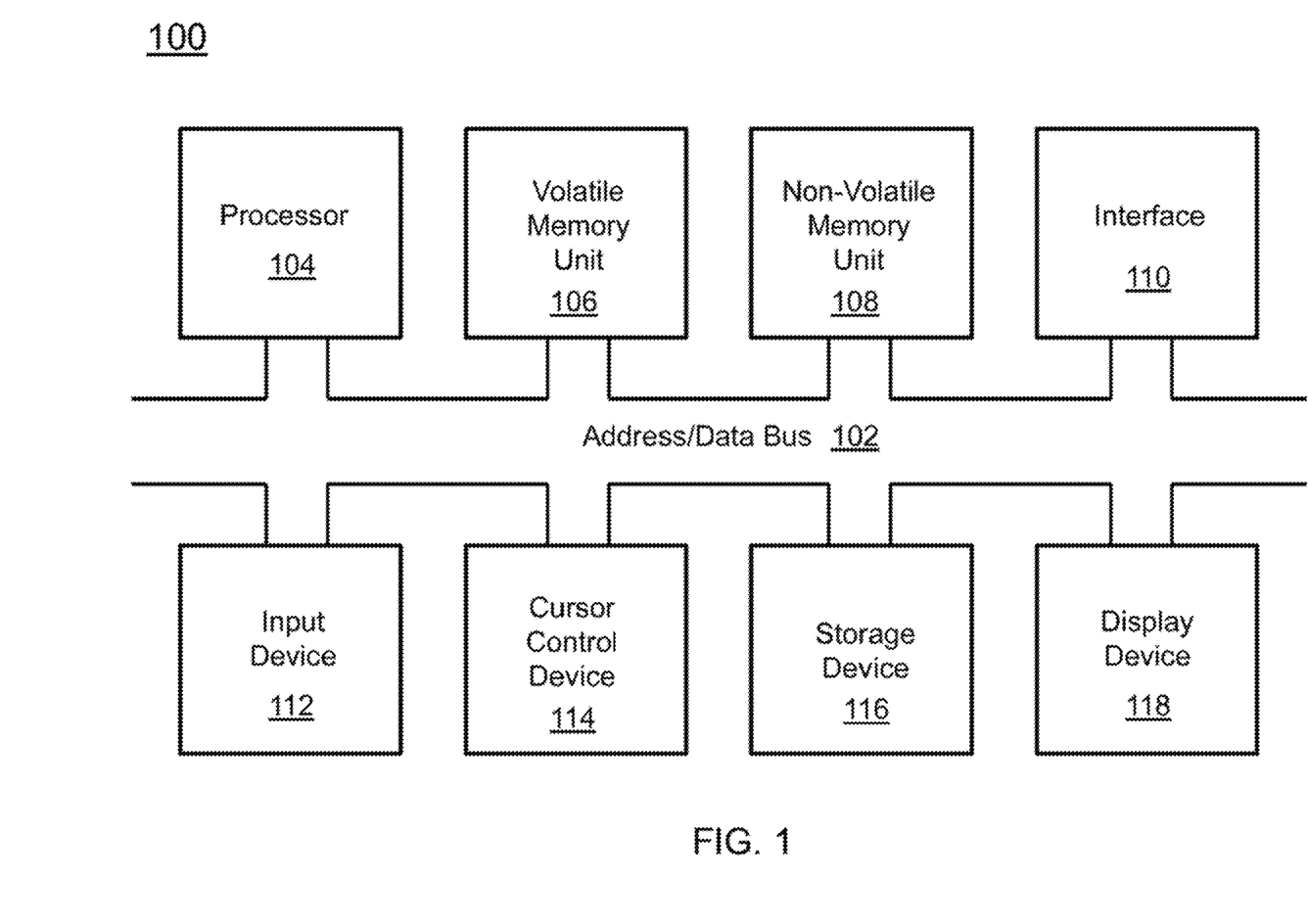
FIG. 1 is a block diagram depicting the components of a system for object recognition according to some embodiments of the present disclosure.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
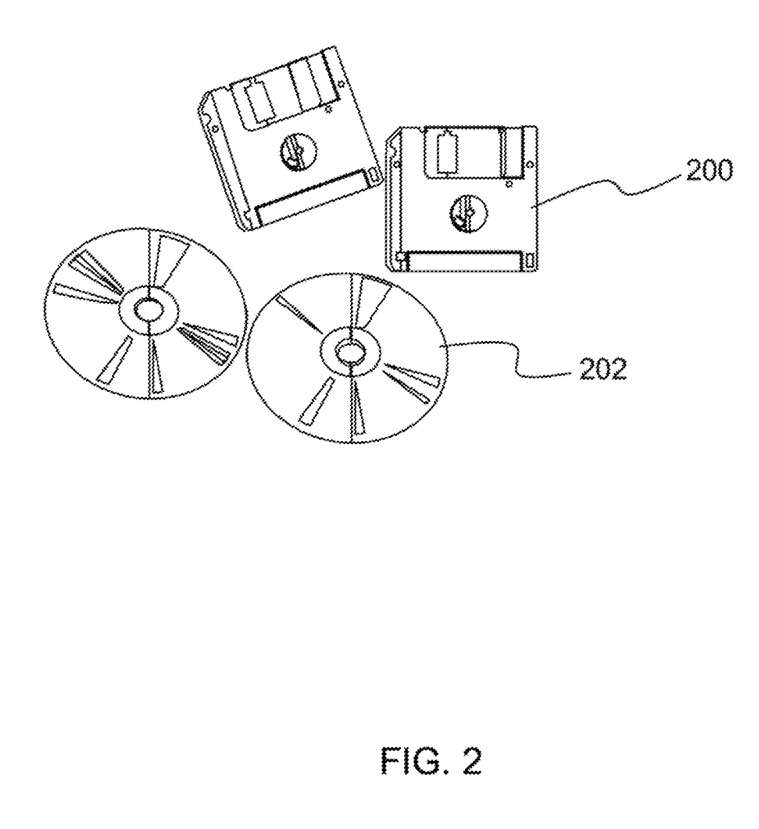
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(3) SPECIFIC DETAILS OF VARIOUS EMBODIMENTS OF THE INVENTION

Described is a system and method to improve zero-shot machine vision systems that can recognize novel objects, even if the systems have never seen any instance of the object in the training phase. The system comprises an attribute aware joint dictionary learning mechanism with a unique attribute-aware formulation for the zero-shot learning (ZSL) problem, which significantly improves the zero-shot performance of the system over existing techniques.

The system contains a training and a testing phase. In the training phase, the system takes as input a set of training images containing objects from many classes of interest, where each object image has been annotated with both class labels (e.g., "bear", "car", "house") and several semantic attributes (e.g., "can fly", "has wheels", "green"). Class labels are typically the nouns or words that would be used to define or describe the object. Semantic attributes are a verbal definition of the object (often an adjective, phrase, or sentence) that contributes to the meaning of the object.

The system described herein uses the training image set and annotated attributes to train a model that maps low level image features (such as edges, corners, and gradients) to semantic attributes. The mapping is learned in a way to capture the shared information between image features and attributes in an optimal manner.

Then, in the testing phase, the system takes as input an image of an object not in the training set (i.e., no instance of the object is included in the training phase), and uses the learned model to map test image features to semantic attributes, so that, given a semantic description for the test object, the test image can be correctly classified despite the test object not having been present in the training image set. The system according to embodiments of the present disclosure includes: 1) modeling the relationship between visual features and semantic attributes using joint sparse representations with respect to dictionaries of visual features and semantic attributes; and 2) an entropy regularization for joint dictionaries that significantly increases the fidelity of the learned representations and improves performance of existing technologies (i.e., an improvement over the state-of-the-art) on publicly available datasets. From an operational stand point, the system described herein minimizes the need for labeled data in supervised learning via knowledge transfer by finding a mapping from the visual data to a semantic attribute space.

The zero-shot learning (ZSL) paradigm aims at classifying previously unseen data classes. The need for ZSL arises mainly from a lack of annotated data, together with the constant emergence of new visual categories (e.g., new products, new models of vehicles, etc.). As described above, the system described herein provides a ZSL machine-vision system that incorporates an attribute-aware joint sparse dictionary learning to model the relationship between visual features of an object and its semantic attributes. The assumption behind ZSL methods is that the training (i.e. seen) and testing (i.e. previously unseen) classes share common semantic attributes. The semantic attributes are often provided as accessible side information (e.g., a word description of the classes), which uniquely describes a data class. In the training phase, the relationship between the seen data and its corresponding attributes is learned. Consequently, in the testing phase, the input data from an unseen class is parsed into its attributes and the label is predicted from these extracted attributes. The invention described herein improves the zero-shot capability of a machine vision system compared to the state-of-the-art by leveraging a mathematically rigorous model that encodes the relationship between an object and its semantic attributes. The attribute-aware joint sparse dictionary model significantly improves the machine vision systems' recognition rates of novel classes that are not part of the training set and increases the state-of-the-art performance in such systems.

A purpose of the invention is to recognize novel objects or scenes in camera images. Although not limited thereto, the camera may be electric optical, infrared (IR), short wave IR, or similar, such that the output is an intensity image with one or more color-like channels. In the ZSL problem, one would like to identify relationships between image features and attributes. The attribute-aware joint dictionary learning method according to embodiments of the present disclosure is a natural fit for this purpose. In short, the feature space and the attribute space are modeled as nonlinear spaces characterized by a union of low-dimensional (i.e., dimensions significantly smaller than the dimension of the feature space) linear spaces. The two nonlinear spaces are constrained to have homologous components, hence the name joint dictionaries, and they are modeled to provide the same representation for image features and their corresponding attributes.

(3.1) Training Phase

Figure 3:
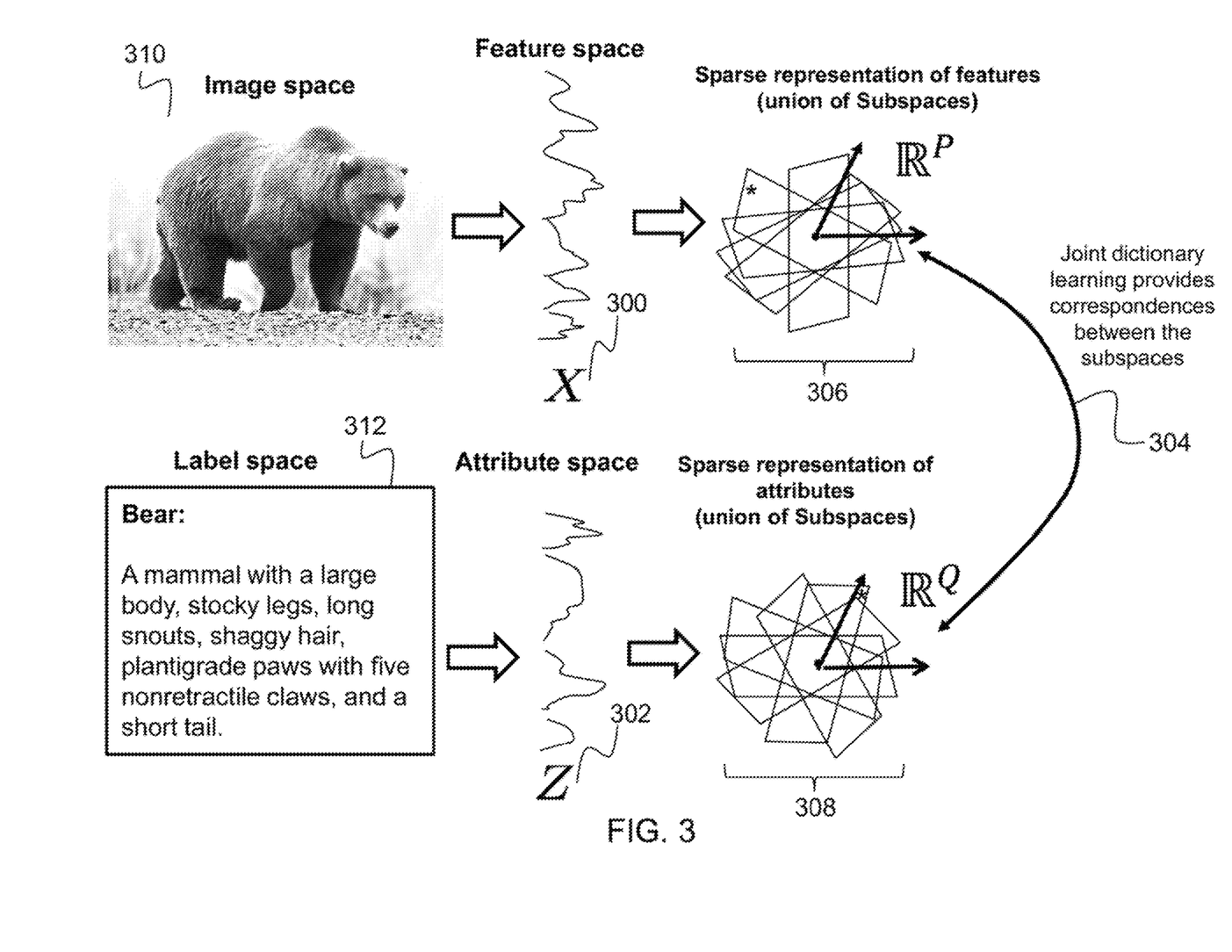
FIG. 3 is an illustration of the training phase of the zero-shot machine vision system according to some embodiments of the present disclosure.

The training phase of the zero-shot machine vision system according to embodiments of the present disclosure is depicted in FIG. 3. The image features (element 300) are extracted from a deep convolutional neural network, while word2vec (see Literature Reference No. 4) is used to extract attributes (element 302) from the verbal description of the class. The joint dictionary learning approach (element 304) enforces that the sparse representations of features (element 306) and of their corresponding attributes (element 308) be the same sparse representations.

In the training phase, there are a set of seen/known images (i.e., image space 310) and a set of their corresponding semantic attributes (i.e., label space 312), as well as the semantic attributes for the previously unseen images. First, a pre-trained Convolutional Neural Network (CNN) (see Literature Reference No. 3 for a description of a CNN) is utilized to extract features (element 300) from images (element 310). CNNs have been shown in prior art to be extremely efficient at extracting features from camera images. Let $X=[x_1, \ldots, x_N]\in R^{P\times N}$ represent the set of features (element 300) extracted from images in the dataset. Here, N is the number of images, and each image has an associated P-dimensional feature vector. Let $Z=[z_1, \ldots, z_N]\in R^{Q\times N}$ represent the set of corresponding attributes (element 302) for the images, each element of Z being a Q-dimensional attribute vector. The word 'attributes' is used in its broadest sense, which encompasses word embeddings or any other semantic information for the images. Moreover, let $Z'=[z'_1, \ldots, z'_M]\in R^{Q\times M}$ be attributes of previously unseen classes of images, where M is the number of such classes.

The label for the i'th image is denoted as $y_i \in R^K$, where the camera image can potentially have multiple memberships of the K classes. The mapping from the attribute space to the label space is conventionally considered to be linear, $y_i = Wz_i$, and known. To further clarify the problem, consider a common scenario in ZSL in which images of horses and tigers are included in X, but X does not contain images of zebras. On the other hand, the semantic attributes contain information of all seen (Z) and unseen (Z') images, including the zebras. Semantic attributes in this case could be the verbal definition of animals (e.g., 'a zebra is a white horse-like animal with black tiger-like stripes'). It can be seen that, by learning the relationship between the image features and the attributes 'horse-like' and 'has stripes' from the seen images, one should be able to assign the previously unseen zebra image to its corresponding attribute.

The system described herein learns two dictionaries with corresponding atoms for X and [Z, Z'] which provide identical sparse representations, $a_i$, for $x_i$ and $z_i$. The idea is that, for the j'th unseen image, the sparse representation of the image, $b_j$, should be close to the sparse representation of $z'_j$. More precisely, start with a classic dictionary learning problem for image features:

$$D_x^*, A^* = \operatorname{argmin}_{D_x, A} \frac{1}{N} \|X - D_x A\|_F^2 + \lambda \|A\|_1 \quad (1)$$
$$\text{s.t. } \|D_x^{[i]}\|_2 \le 1, \forall i \in \{1, \ldots, L\}$$

where $D_x \in R^{P \times L}$ is the image feature dictionary, $A \in R^{L \times N}$ is the joint sparse representation of X and Z, L is the number of dictionary atoms, and $D_x^{[i]}$ is the i'th atom of $D_x$. Given the sparse representation of X, A*, one wants to find a dictionary for Z, $D_z$, that uses the same sparse representation A and reconstructs the attributes, $Z \approx D_z A^*$. In addition, one would like the learned dictionary to provide a sparse representation for attributes of the unseen classes of images, Z'. To achieve these objectives, the following optimization problem was used to find $D_z$:

$$D_z^*, B^* = \operatorname{argmin}_{D_z, B} \frac{1}{N} \|Z - D_z A^*\|_F^2 + \frac{1}{M} \|Z' - D_z B\|_F^2 + \lambda \|B\|_1 \quad (2)$$
$$\text{s.t. } \|D_z^{[i]}\|_2 \le 1, \forall i \in \{1, \ldots, L\},$$

where $D_z \in R^{Q \times L}$ is the attribute dictionary, and $B \in R^{L \times M}$ is the sparse representation of Z'. FIG. 3 illustrates the idea behind the above formulation of the problem. Equations (1) and (2) are not convex in ($D_x$, A) and ($D_z$, B) respectively; however, they are convex in each individual parameter given the rest. Hence, an iterative scheme was devised to solve for one of the dictionaries (i.e., $D_x$ and $D_z$) at a time and fixing the other, until convergence is achieved. Convergence to local optima is guaranteed. Each optimization is minimized by solving a Lasso problem (see Literature Reference No. 6 for a description of the Lasso problem) to find the sparse representations followed by a Quadratically Constrained Quadratic Program (QCQP) (see Literature Reference No. 7) to update the dictionaries. The steps are then repeated.

(3.2) Testing Phase

Figure 4:
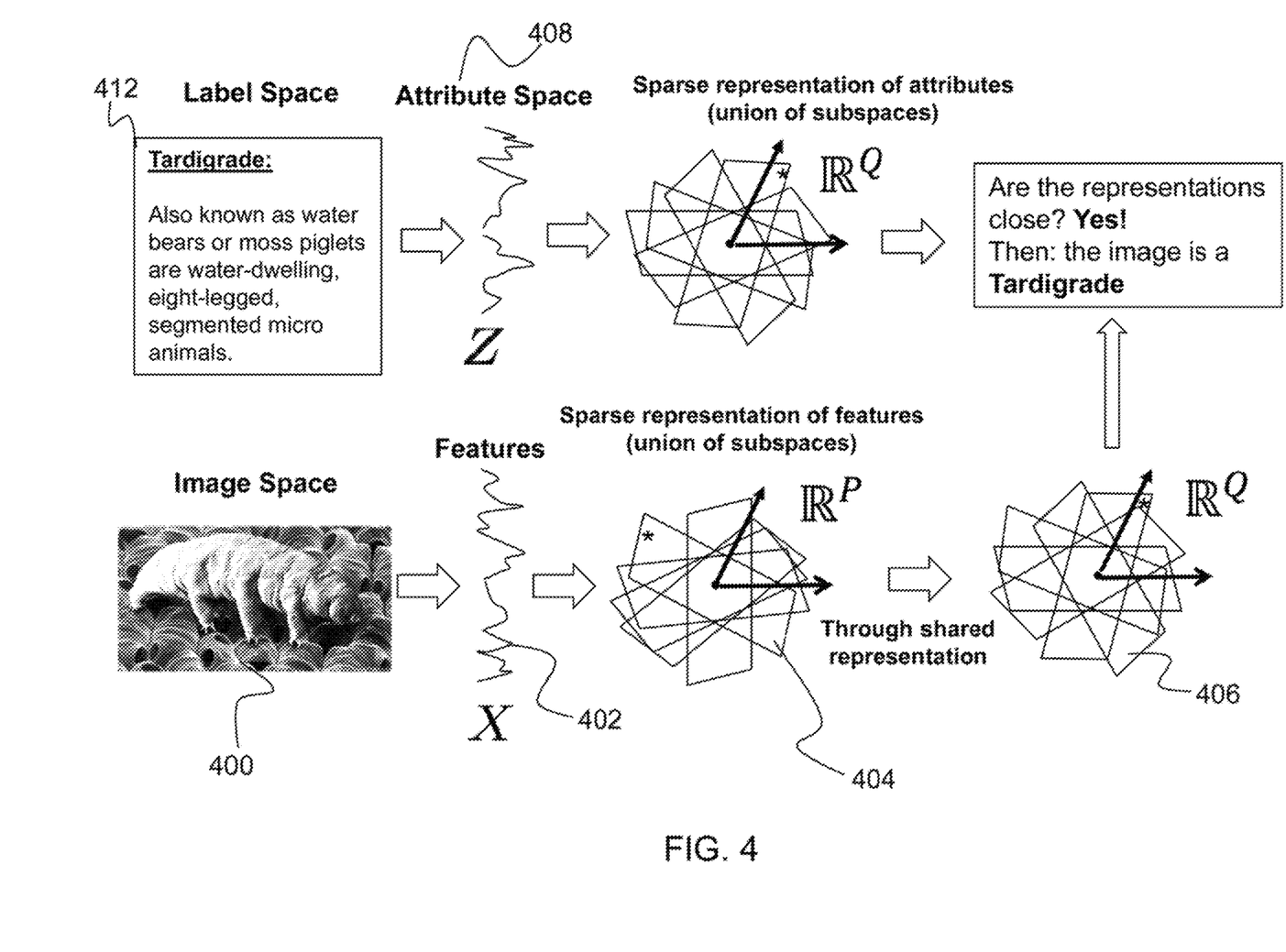
FIG. 4 is an illustration of finding a sparse representation of an image according to some embodiments of the present disclosure.

In the testing phase, the extracted feature from a previously unseen image, $x \in R^P$, is first represented as linear combinations of the atoms of dictionary $D_x$ through sparse linear mixture coefficients $\alpha$, $X \approx D_x \alpha$. FIG. 4 shows a schematic of the testing phase for an input image (element 400), the image features (element 402) are first extracted and a Lasso problem is solved to find the sparse representation of the image (element 404). Given that the sparse representation is shared among features and attributes, image attributes are estimated (element 406), and the closest attribute in the attribute space (element 408) is found.

To find the sparse representation, two different formulations are utilized, namely attribute-agnostic and attribute-aware formulations, which are described below.

(3.2.1) Attribute Agnostic Formulation

In the attribute agnostic formulation, for a feature extracted from a previously unseen image, $X \in R^P$, find its sparse representation by solving the following Lasso problem:

$$\alpha^* = \operatorname{argmin}_\alpha \|x - D_x \alpha\|_2^2 + \lambda \|\alpha\|_1. \quad (3)$$

The reason this formulation is called attribute-agnostic is that the sparse coefficients are found without any information/constraints from the attribute space.

(3.2.2) Attribute Aware Formulation

Figure 5:
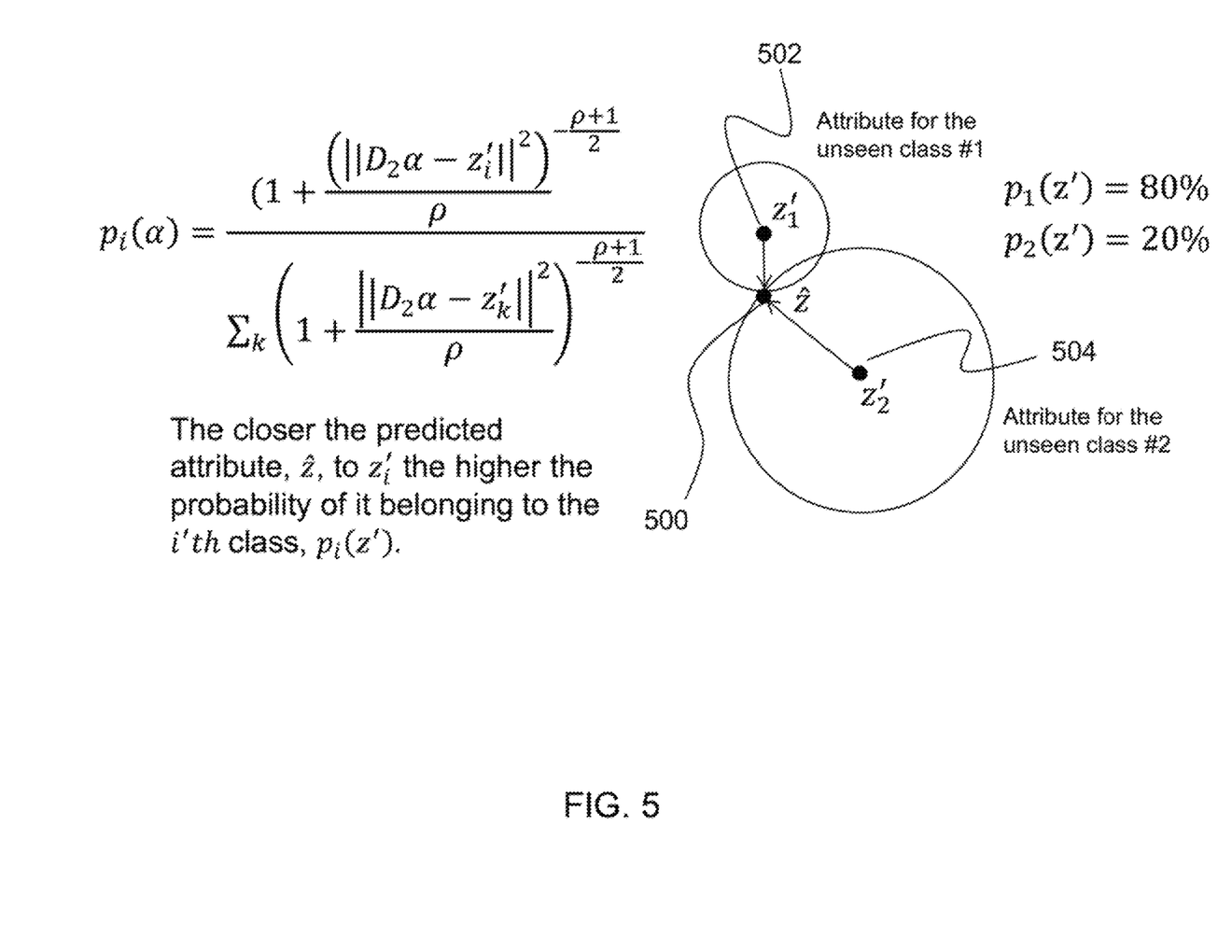
FIG. 5 is an illustration of identification of the probability of prediction that an attribute belongs to an unseen class of images according to some embodiments of the present disclosure.

In the attribute-aware formulation, one would like to find the sparse representation $\alpha$ to not only approximate the input test feature, $x \approx D_x \alpha$, but also provide an attribute prediction, $\hat{z} = D_z \alpha$, that is well resolved in the attribute space. Ideally, $\hat{z} = z'_i$ for some i in the attributes of the testing classes (i.e., previously unseen). To achieve this, the soft assignment of $\hat{z}$ to $z'_i$, denoted by $p_i$, is defined using the Student's t-distribution as a kernel to measure similarity between $\hat{z} = D_z \alpha$ and $z'_i$, $$p_i(\alpha) = \frac{\left(1 + \frac{\|D_z \alpha - z'_i\|^2}{\rho}\right)^{\frac{-\rho+1}{2}}}{\sum_k \left(1 + \frac{\|D_z \alpha - z'_k\|^2}{\rho}\right)^{\frac{-\rho+1}{2}}} \quad (4)$$

where $\rho$ is the kernel parameter. Ideally, $p_j = 1$ for some $j \in \{1, \ldots, M\}$ and $p_i = 0$ for $i \neq j$. In other words, the ideal soft-assignment $p(\alpha) = [p_1(\alpha), p_2(\alpha), \ldots, p_M(\alpha)]$ would be one-sparse and have minimum entropy. FIG. 5 depicts the idea of soft-assignment, in which the soft-assignment, $p_i$, identifies the probability of prediction $\hat{z} = D_z \alpha$ belonging to class i of unseen images. The closer the predicted attribute, $\hat{z}$ (element 500) is to $z'_i$ (e.g., $z'_1$ (element 502) or $z'_2$ (element 504)), the higher the probability of it belonging to the i'th class, $p_i$ (z'). This motivates the attribute-aware formulation, which penalizes the attribute-agnostic optimization in Equation (3) with the entropy of $p(\alpha)$. Below is the Attribute-Aware formulation of the problem according to embodiments of the present disclosure:

$$\alpha^* = \operatorname{argmin}_\alpha \|x - D_x \alpha\|_2^2 + \lambda \|\alpha\|_1 - \gamma \Sigma_i p_i(\alpha) \log(p_i(\alpha)), \quad (5)$$

where $\gamma$ is the regularization parameter for entropy of the soft-assignment probability vector p. Note that above formulation is not convex. The entropy minimization has been successfully used in several works, including Literature Reference Nos. 9 and 10, whether as a sparsifying regularization or to boost the confidence of a classifier. In Literature Reference No. 10, the authors use a generalized gradient descent approach similar to FISTA (see Literature Reference No. 11) to optimize the non-convex problem. A similar scheme is used to optimize the objective function in Equation (5) in the method described herein. Due to the non-convex nature of the objective function, a good initialization is needed to achieve a sensible solution. Therefore, $\alpha$ was initialized from the solution of the attribute-agnostic formulation.

(3.2.3) Label Prediction

After finding the sparse coefficients $\alpha$, the predicted attribute for the input image is $\hat{z} = D_z \alpha^*$ and, finally, the image is labelled by using the label of the closest test attribute in the attribute space. If additional information is provided to the system (for instance, by an external module), indicating that the object is from an unseen class, the system uses the following to label the image:

$$z^* = \operatorname{argmin}_{z \in Z'} \|z - D_z \alpha^*\|_2^2.$$

If no additional information is provided, the following alternative to the above equation is used:

$$z^* = \operatorname{argmin}_{z \in \{Z, Z'\}} \|z - D_z \alpha^*\|_2^2.$$

Finally, the label for the unseen image (element 400) is found by mapping the found attribute to the label space y*=Wz* (element 412).

(3.3) Experimental Studies

Figure 6:
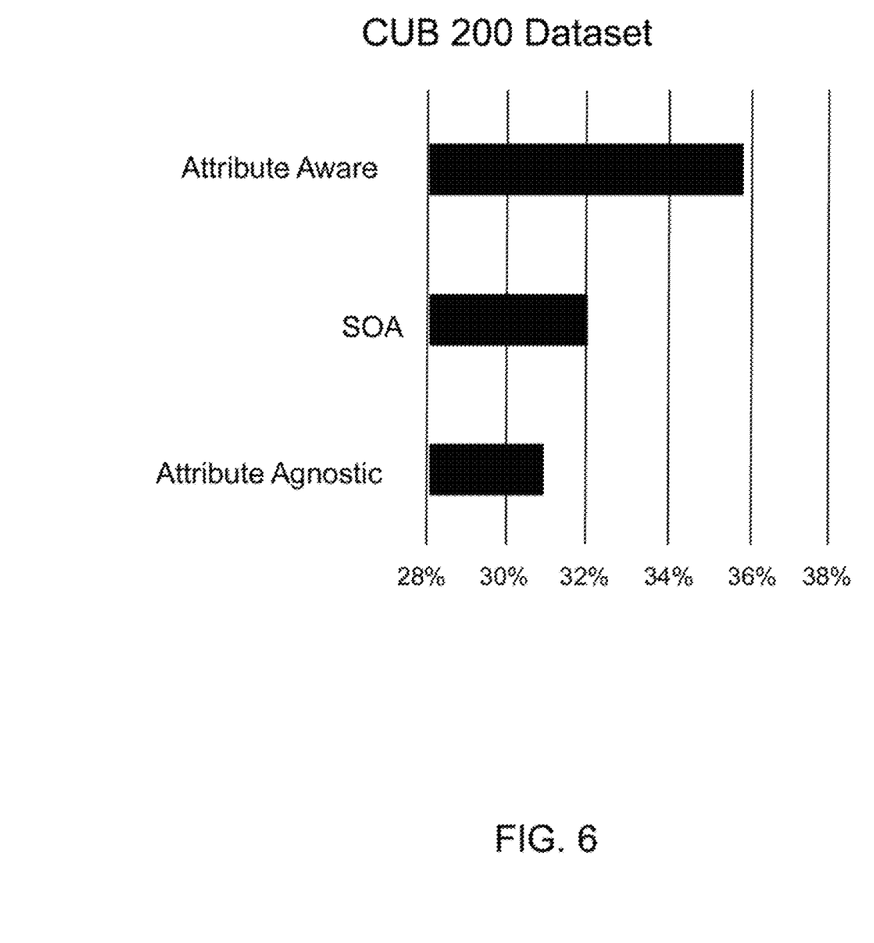
FIG. 6 is an illustration of a chart depicting test classification accuracy for a dataset according to some embodiments of the present disclosure.

The system according to embodiments of the present disclosure was tested on the CUB200 dataset (see Literature Reference No. 12), which is a publicly available zero-shot dataset. The dataset contains 6,033 images of 200 different classes of birds. The images are processed with a pre-trained CNN (see Literature Reference No. 3) and human-annotated attributes are provided for the dataset (see Literature Reference No. 12). In the experimental studies, 75% of classes (150 classes) were used for training while the remaining 25% (50 classes) remained unseen, and the attribute-aware joint dictionary learning algorithm described herein was applied to predict the labels of these 50 classes. FIG. 6 shows the results of the method according to this disclosure compared to the current state-of-the-art result on this dataset. As shown, the system described herein is able to recognize the 50 unseen images with 36% accuracy. Note that random prediction accuracy in this experiment would be 2%.

The invention described herein improves upon existing technologies. The closest analogous approach was proposed by Yang et al. (see Literature Reference No. 8), who used a method of joint sparse dictionary learning as a way to perform super-resolution of a low-resolution image. However, in their approach, a model is learned that maps low-resolution image patches to high-resolution image patches. Both of these domains are image domains, and, thus, have similar mathematical and statistical properties, making the joint dictionary learning more straightforward. It is not obvious to one with ordinary skill in the art how to apply the approach of Yang et al. to the ZSL object recognition problem that the invention addresses. Isele et al. (see Literature Reference No. 4) used joint dictionaries for zero-shot knowledge transfer in a small scale reinforcement learning problem, which is significantly simpler than the zero-shot problem in vision. The proposed approach by Isele et al. (see Literature Reference No. 4) fails to address the domain shift problem from the seen to unseen classes, while the attribute aware formulation of the problem described herein addresses this issue. In addition, the method by Isele et al. (see Literature Reference No. 4) lacks the generalizability to high-dimensional feature spaces (e.g., feature spaces of order $10^3$), which is a necessary requirement for zero-shot problem in vision, while the technique according to embodiments of the present disclosure is generalizable.

Furthermore, the system according to embodiments of the present disclosure addresses the need for robust machine vision systems on autonomous platforms (e.g., drones, unmanned aerial vehicles (UAVs)) and autonomous vehicles. The invention described herein provides the capability of effectively adapting to novel scenarios (e.g., novel objects, weather conditions, etc.) and enables future transfer learning technologies. For instance, the system can generate an alert when an avoidance object is detected, such that the autonomous platform is caused to perform an automatic operation, such as a braking or swerving operation to avoid hitting the object. The alert can be an audible alert (e.g., beep, tone) and/or a visual alert (e.g., light or message on dashboard). For example, if the object is a stop sign, the system may cause the autonomous vehicle to apply a functional response, such as a braking operation, to stop the vehicle. Other appropriate responses may include one or more of a steering operation, a throttle operation to increase speed or to decrease speed, or a decision to maintain course and speed without change. The responses may be appropriate for avoiding a collision, improving travel speed, or improving efficiency.

Figure 7:
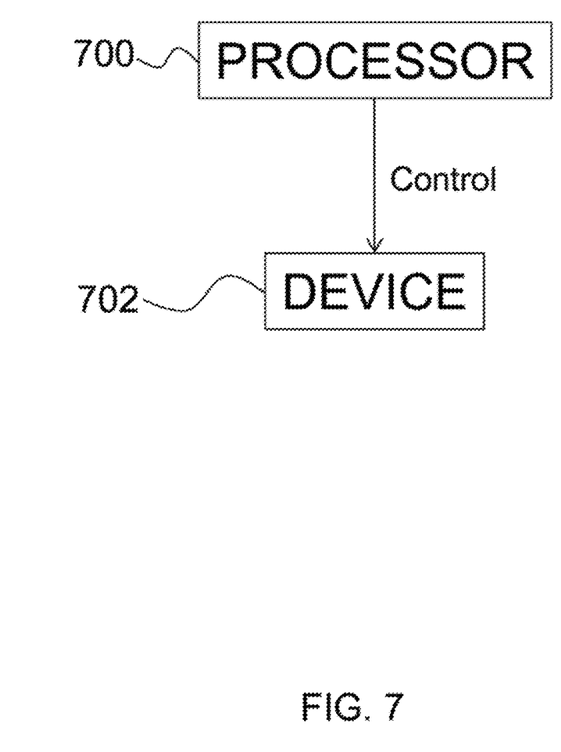
FIG. 7 is an illustration of using a processor to control a device based on the classification of an unseen image according to some embodiments of the present disclosure.

FIG. 7 is a flow diagram illustrating using a processor 700 to control a device 702 using the classification of an unseen image. Non-limiting examples of devices 702 that can be controlled via the processor 700 and the classifications of unseen images include a vehicle or a vehicle component, such as a brake, a steering mechanism, suspension, or safety device (e.g., airbags, seatbelt tensioners, etc.). Further, the vehicle could be an unmanned aerial vehicle (UAV), an autonomous ground vehicle, or a human operated vehicle controlled either by a driver or by a remote operator. As can be appreciated by one skilled in the art, control of other device types is also possible.

Current state-of-the-art machine vision systems require large amounts of training data covering a wide range of classes for all possible scenarios. Obtaining annotated data for all visual classes is practically impossible and, hence, there is a dire need for learning systems that can transfer and adapt their learned knowledge to reason about novel classes. The attribute aware joint sparse visual feature and sematic attribute modeling system of this disclosure enables one to perform zero-shot machine vision with far fewer training examples than existing systems.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for object recognition, the system comprising:
one or more processors and a non-transitory computer-readable medium having executable instructions encoded thereon such that when executed, the one or more processors perform operations of:
using a training image set and annotated semantic attributes, training a model that maps visual features from known images to the annotated semantic attributes using joint sparse representations with respect to dictionaries of visual features and semantic attributes;
using the trained model for mapping visual features of an unseen input image to its semantic attributes;
classifying the unseen input image as belonging to an image class; and
controlling a device based on the classification of the unseen input image, wherein the device is a vehicle component, and controlling the device results in a vehicle maneuver.

2. The system as set forth in claim 1, wherein the one or more processors further perform an operation of generating a training image set comprising object images from a plurality of image classes, wherein each object image in the training image set has been annotated with a class label and semantic attributes describing the object image.

3. The system as set forth in claim 1, wherein for training the model, a visual feature space and a semantic attribute space are modeled as nonlinear spaces that provide an identical sparse representation for visual features and their corresponding semantic attributes.

4. The system as set forth in claim 1, wherein the one or more processors further perform operations of:
finding a sparse representation for a visual feature extracted from the unseen input image; and
generating a semantic attribute prediction that is resolved in the semantic attribute space of the model, wherein a soft-assignment probability vector identifies a probability of the semantic attribute prediction belonging to a class of unseen images.

5. The system as set forth in claim 4, wherein a regularization parameter is used to regulate entropy of the soft-assignment probability vector.

6. The system as set forth in claim 4, wherein, given the semantic attribute prediction, the unseen input image is labeled using a class label of a closest semantic attribute in the semantic attribute space of the model.

7. A computer implemented method for object recognition, the method comprising an act of:
causing one or more processors to execute instructions encoded on a non-transitory computer-readable medium, such that upon execution, the one or more processors perform operations of:
using a training image set and annotated semantic attributes, training a model that maps visual features from known images to the annotated semantic attributes using joint sparse representations with respect to dictionaries of visual features and semantic attributes;
using the trained model for mapping visual features of an unseen input image to its semantic attributes;
classifying the unseen input image as belonging to an image class; and
controlling a device based on the classification of the unseen input image, wherein the device is a vehicle component, and controlling the device results in a vehicle maneuver.

8. The method as set forth in claim 7, wherein the one or more processors further perform an operation of generating a training image set comprising object images from a plurality of image classes, wherein each object image in the training image set has been annotated with a class label and semantic attributes describing the object image.

9. The method as set forth in claim 7, wherein for training the model, a visual feature space and a semantic attribute space are modeled as nonlinear spaces that provide an identical sparse representation for visual features and their corresponding semantic attributes.

10. The method as set forth in claim 7, wherein the one or more processors further perform operations of:
finding a sparse representation for a visual feature extracted from the unseen input image; and
generating a semantic attribute prediction that is resolved in the semantic attribute space of the model, wherein a soft-assignment probability vector identifies a probability of the semantic attribute prediction belonging to a class of unseen images.

11. The method as set forth in claim 10, wherein a regularization parameter is used to regulate entropy of the soft-assignment probability vector.

12. The method as set forth in claim 10, wherein, given the semantic attribute prediction, the unseen input image is labeled using a class label of a closest semantic attribute in the semantic attribute space of the model.

13. A computer program product for object recognition, the computer program product comprising:
a non-transitory computer-readable medium having executable instructions encoded thereon, such that upon execution of the instructions by one or more processors, the one or more processors perform operations of:
using a training image set and annotated semantic attributes, training a model that maps visual features from known images to the annotated semantic attributes using joint sparse representations with respect to dictionaries of visual features and semantic attributes;
using the trained model for mapping visual features of an unseen input image to its semantic attributes;
classifying the unseen input image as belonging to an image class; and
controlling a device based on the classification of the unseen input image, wherein the device is a vehicle component, and controlling the device results in a vehicle maneuver.

14. The computer program product as set forth in claim 13, further comprising instructions for causing the one or more processors to further perform an operation of generating a training image set comprising object images from a plurality of image classes, wherein each object image in the training image set has been annotated with a class label and semantic attributes describing the object image.

15. The computer program product as set forth in claim 13, wherein for training the model, a visual feature space and a semantic attribute space are modeled as nonlinear spaces that provide an identical sparse representation for visual features and their corresponding semantic attributes.

16. The computer program product as set forth in claim 13, further comprising instructions for causing the one or more processors to further perform operations of:
finding a sparse representation for a visual feature extracted from the unseen input image; and
generating a semantic attribute prediction that is resolved in the semantic attribute space of the model, wherein a soft-assignment probability vector identifies a probability of the semantic attribute prediction belonging to a class of unseen images.

17. The computer program product as set forth in claim 16, wherein a regularization parameter is used to regulate entropy of the soft-assignment probability vector.

18. The computer program product as set forth in claim 16, wherein, given the semantic attribute prediction, the unseen input image is labeled using a class label of a closest semantic attribute in the semantic attribute space of the model.

19. The system as set forth in claim 1, wherein the vehicle maneuver is a collision avoidance maneuver.

20. The system as set forth in claim 1, wherein the unseen input image is an image of an avoidance object, and wherein an alert is generated when the avoidance object is classified.

* * * * *